US006791913B1

(12) United States Patent
Ishimoto

(10) Patent No.: US 6,791,913 B1
(45) Date of Patent: Sep. 14, 2004

(54) OPTICAL RECORDING APPARATUS, OPTICAL RECORDING/REPRODUCING METHOD

(75) Inventor: Tsutomu Ishimoto, Saitama (JP)

(73) Assignee: Sony Corporation, Tokyo (JP)

( * ) Notice: Subject to any disclaimer, the term of this patent is extended or adjusted under 35 U.S.C. 154(b) by 735 days.

(21) Appl. No.: 09/652,897

(22) Filed: Aug. 31, 2000

(30) Foreign Application Priority Data

Sep. 7, 1999 (JP) .......................................... P11-253296

(51) Int. Cl.[7] .................................................. G11B 7/00
(52) U.S. Cl. .................................. 369/44.25; 369/53.26
(58) Field of Search ........................... 369/44.11, 44.14,
369/44.25, 44.41, 112.11, 112.13, 112.14,
112.2, 112.21, 112.23, 112.24, 112.25, 11.26,
13.33, 13.26, 53.26, 53.27, 53.31, 59.11,
44.31, 47.5, 47.52

(56) References Cited

U.S. PATENT DOCUMENTS

| | | | |
|---|---|---|---|
| 5,497,359 A | | 3/1996 | Mamin et al. |
| 5,712,842 A | * | 1/1998 | Yamamoto et al. ..... 369/112.26 |
| 5,986,995 A | | 11/1999 | He et al. |
| 6,097,688 A | * | 8/2000 | Ichimura et al. ....... 369/112.24 |
| 6,115,347 A | * | 9/2000 | Ichimura et al. ....... 369/112.24 |
| 6,141,153 A | * | 10/2000 | Hendriks ..................... 359/641 |
| 6,229,600 B1 | * | 5/2001 | Martynov .................... 356/123 |
| 6,292,453 B1 | * | 9/2001 | Ichimura et al. ....... 369/112.24 |
| 6,594,205 B1 | * | 7/2003 | Aarts et al. ............... 369/44.23 |

FOREIGN PATENT DOCUMENTS

| | | |
|---|---|---|
| EP | 1 041 545 | 10/2000 |
| EP | 1 052 627 | 11/2000 |
| JP | 10-142494 | 5/1998 |

* cited by examiner

Primary Examiner—Thang V. Tran
Assistant Examiner—Bach Vuong
(74) Attorney, Agent, or Firm—Oblon, Spivak, McClelland, Maier & Neustadt, P.C.

(57) ABSTRACT

When an external disturbance that causes the corrected amount of light reflected from a glass master disk 15 to surpass a threshold value T1 is applied to the control loop, not only the main control section 38 but also the sub-control section 37 controls the corrected amount 27. In this case, the influence of the external disturbance is suppressed quickly. More specifically, the control voltage of the main control section 38 is held the moment the corrected amount 27 of light reflected surpasses the threshold value T1. The sub-control section 37 controls the corrected amount 27 while the corrected amount 27 remains greater than the threshold value T1, and the sum of the control voltages of the main control section 38 and sub-control section 37 is applied to the piezoelectric element 23, thereby suppressing the influence of the external disturbance.

13 Claims, 10 Drawing Sheets

OPTICAL RECORDING APPARATUS, OPTICAL RECORDING/REPRODUCING METHOD

BACKGROUND OF THE INVENTION

The present invention relates to an optical recording apparatus that can record data by applying light to a recording medium. More particularly, the invention relates to an optical recording apparatus which can record data signals at high density, which has an objective lens of a large numerical aperture and which is designed to record data signals with the objective lens held at a short distance from the surface of an optical recording medium. The invention also relates to an optical recording/reproducing method in which data is recorded on and reproduced from an optical recording medium, while a specific distance is maintained between an objective lens of a large numerical aperture and the optical recording medium.

A representative technique of recording and reproducing data by using near-field light is to use two lenses (hereinafter referred to as "two-group lens"). One of these lenses is a solid-immersion lens (SIL). The other of the lenses is a condensing lens. This technique has been devised to make a spot diameter even smaller, thereby to meet the demand that data be recorded at high density on optical disks. The SIL is interposed between the condensing lens and an optical disk and provides numerical aperture larger than that of the condensing lens. The SIL is a high-refractivity lens made by cutting a part of a spherical lens. It is positioned, with its spherical surface opposing the condensing lens and its other surface facing the optical recording medium.

A near-field signal output by the SIL may be used to record data and reproduce data optically. To this end, two requirements must be fulfilled. First, the surface of the SIL and the optical recording medium must be reduced to a value (half the wavelength of the light or a shorter distance, or 200 nm or less in most cases) that serves to generate a near-field light beam and be maintained at this value. Second, focus control must be achieved to set the spot of a condensed beam at a constant value on the optical recording medium.

A representative technique employed in optical recording apparatuses of this type is to use an air-bearing slider. A two-group lens is mounted on the air-bearing slider and the optical recording medium is rotated. A film of air is thereby formed between the optical recording medium and the two-group lens mounted on the bearing. The two-group lens floats by virtue of the pressure of the film, maintaining a constant distance between the surface of the SIL and the optical recording medium. This technique is similar to the method used in magnetic recording to control the distance between the magnetic head and the recording medium.

A lubricant may be applied to that surface of the optical recording medium that receives light, thereby increasing the focal depth. In this case, the focus can be stabilized even if the optical recording medium has depressions and projections at the surface or dusts exists on the surface of the medium in the distance control achieved by the use of the above-mentioned air-bearing slider.

These conventional techniques are disadvantageous, however. First, in the method of using the air-bearing slider only, no active control is carried out against the external disturbance resulting from scars or depressions existing in the surface of the optical recording medium, causing the possibility for defocusing. Further, the gap cannot be controlled unless the medium is rotated, making it impossible to accomplish focus control.

Secondly, in the method of applying a lubricant to the light-receiving surface of the optical recording medium, defocusing may occur place even if the focal depth is increased, as long as the optical medium has depressions and projections at the surface or dusts exists on the surface of the medium. Moreover, this method is inappropriate for disks having a photoresist coating, such as CDs and DVDs, because a lubricant is applied to the light-receiving surface of the optical recording medium.

BRIEF SUMMARY OF THE INVENTION

The present invention has been made in view of the foregoing. The object of this invention is to provide an optical recording apparatus in which the distance between the surface of SIL and the optical recording medium can be maintained constant to prevent defocusing, whether the disk is rotating or not, even if scars or depressions exist in the surface of the medium, and which can record data at high density, and which can be manufactured with ease. Another object of the invention is to provide an optical recording/reproducing method that can record data at high density.

To achieve the first object, an optical recording apparatus according to the invention comprises: first optical means for condensing light to be applied to an optical recording medium, said first optical means having a numerical aperture; second optical means interposed between the first optical means and the optical recording medium, for attaining a numerical aperture larger than the numerical aperture of the first optical means; and main control means for maintaining a predetermined distance between the second optical means and the optical recording medium, by utilizing a linear characteristic of an amount of light reflected from the optical recording medium in a near-field region provided between an end of the second optical means and the optical recording medium.

The optical recording apparatus may further comprises means for setting a threshold value corresponding to the amount of the light reflected from the optical recording medium and a control target value falling within the linear characteristic of the amount of light reflected, and a sub-control means for suppressing the influence of the amount of light reflected when the amount of light reflected is greater than the threshold value. In this case, the main control means or the sub-control means, or both are used in accordance with a relation the amount of light reflected has with the threshold value or the control target value.

To attain the second object, an optical recording/reproducing method according to the invention comprises: a main control step of maintaining a predetermined distance between second optical means and an optical recording medium by utilizing a linear characteristic of an amount of light reflected from the optical recording medium in a near-field region provided between an end of the second optical means and the optical recording medium, thereby to impart to the second optical means a numerical aperture larger than the numerical aperture of a first optical means, said second optical means having been interposed between the first optical means and the optical recording medium; a setting step of setting a threshold value for the amount of light reflected from the optical recording medium and a control target value falling within the within the linear characteristic of the amount of light reflected; and a sub-control step of suppressing the influence of the amount of light reflected when the amount of light reflected is greater than the threshold value. In the method, the main control step or the sub-control step, or both are performed in accordance with a relation the amount of light reflected has with the threshold value or the control target value.

In the optical recording apparatus according to the present invention, a constant distance can be maintained between the objective lens and the optical recording medium, no matter whether the medium is rotating or not, while a near-field beam is emerging from the optical recording medium. The size of the light spot formed on the surface of the medium can thereby remain constant. It is therefore possible to record data on and reproduce data from optical disks by the use of a near-field light beam. In addition, stable focus control can be achieved, in spite of external disturbances.

Moreover, the present invention makes it possible to record data by the use of a near-field light beam in cutting machines that are designed to manufacture DCs and DVDs.

DETAILED DESCRIPTION OF THE INVENTION

An embodiment of the present invention will be described, with reference to the accompanying drawings. It should be noted, however, that the invention is not limited to this embodiment.

Figure 1:
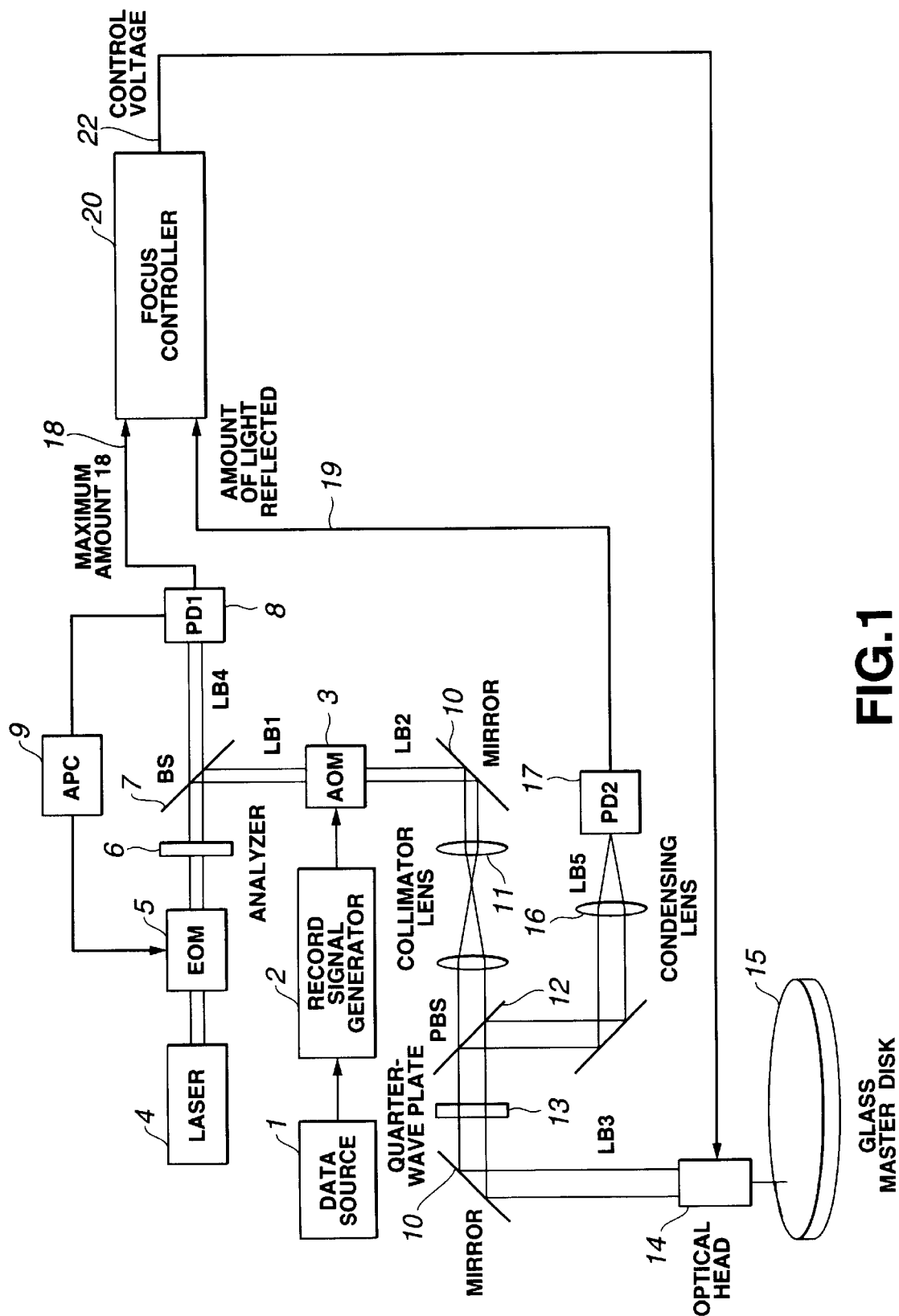
FIG. 1 is a block diagram illustrating an optical recording apparatus according to this invention.

FIG. 1 shows an optical recording apparatus, i.e., an embodiment of the invention, which can use an optical recording/reproducing method according to the present invention. The embodiment is a so-called "cutting machine" that applies a laser beam modulated by data, onto a glass master disk coated with photoresist, thereby to record the data on the glass master disk.

A laser element 4 emits a recording laser beam LB1, which is applied to an acoustic optical modulator (AOM) 3 through an electro-optical modulator (EOM) 5, an analyzer 6 (i.e., polarizing plate) and a beam splitter (BS) 7. The AOM 3 modulates the laser beam LB1 in accordance with the digital data which a record signal generator 2 has generated from the data supplied from a data source 1.

The laser beam LB2 output from the AOM 3 is applied to a collimator lens 11, which converts the beam LB2 to a parallel beam. The parallel beam is applied to a quarter-wave plate 13 via a beam splitter (PBS) 12.

The modulated laser beam LB2 passes through the quarter-wave plate 13 and is converted to a circularly polarized beam. This beam is applied to the glass master disk 15, forming a beam spot thereon. A focus controller 20 controls an optical head 14, thereby the focusing the beam on the glass master disk 15. Thus, the distance between the head 14 and the glass master disk 15 is maintained constant.

The laser beam LB3 incident on the optical head 14 forms a light spot on the glass master disk 15 coated with photoresist. The light spot has its diameter set to a specific value by means of focus control. Using the light spot, cutting is performed on the resist-coated glass master disk 15 in accordance with the data to be recorded.

A laser beam LB4, which is a part of the laser beam emitted from the laser element 4, passes through the EOM 5, analyzer 6 and BS 7 and is detected by a photodetector (PD1) 8. The photodetector 8 converts the laser beam LB4 to an electric signal, which is input to an automatic power controller (APC) 9. Namely, the value of the electric signal is fed back to the EOM 5, whereby the power to the laser element 4 is controlled to a constant value. Thus, the amount of light remains constant at the maximum value 18 by means of an APC 9.

In the meantime, the laser beam LB3 reflected from the disk 15 and applied from the optical head 14 passes through the quarter-wave plate 13 and converted to a linear polarized beam. The linear polarized beam is applied via the PBS12 to a condensing lens 16, which outputs a beam LB5. The beam LB5 is applied to a photodetector (PD2) 17, which detects the amount 19 of light reflected from the glass master disk 15.

The focus controller 20 receives the maximum amount 18 of light and the amount 19 of light reflected from the disk 15. The focus controller 20 generates a reference signal from the maximum amount 18 of light, i.e., the constant amount of light. The controller 20 generates an optical-head controlling voltage 21 from the amount 19 of light reflected from the disk 15 and applied from the optical head 14. The voltage 21 will control the optical head 14 to maintain a constant distance between the head 14 and the disk 15, as will be later described in detail.

The source of the reference signal is the maximum amount 18 of light, which remains constant. Nonetheless, a constant voltage source may be used instead, to generate the reference signal.

Figure 2:
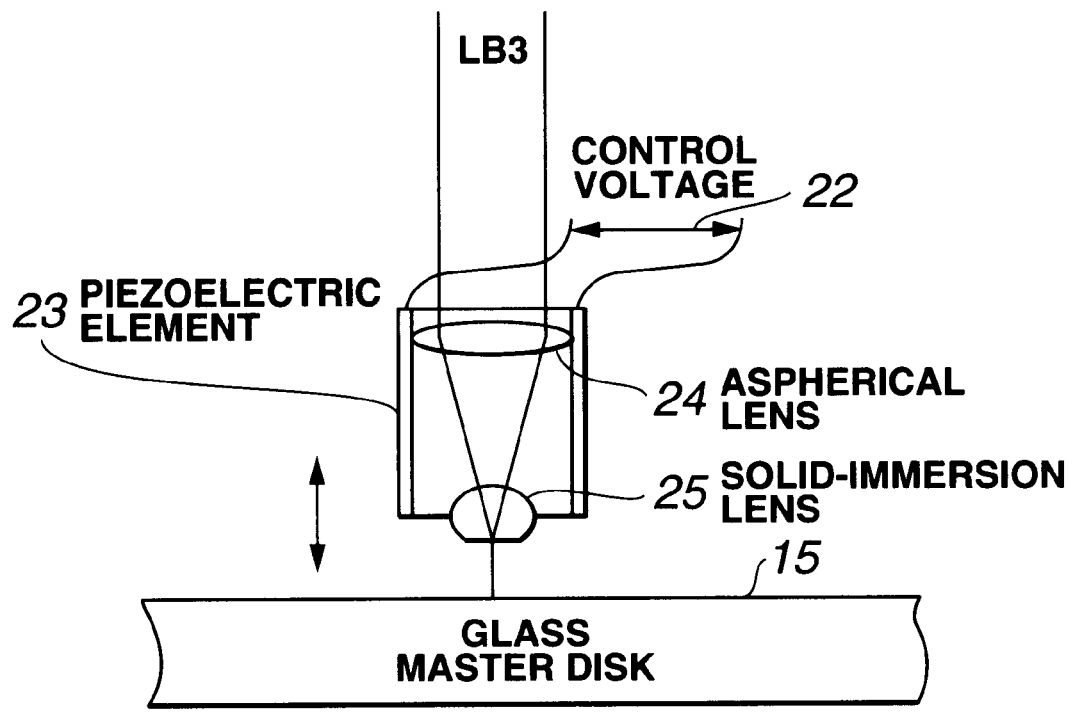
FIG. 2 is a diagram showing the optical head incorporated in the optical recording apparatus.

FIG. 2 shows the optical head 14 incorporated in the optical recording apparatus. The optical head 14 comprises two optical components. The first component is an aspherical lens 24. The second component is a solid-immersion lens (SIL) 25. (Hereinafter, these lenses 24 and 25 will hereinafter referred to as "two-group lens.") The two-group lens is secured to a piezoelectric element 23. The laser beam LB3 incident on the two-group lens is focused by the aspherical lens 24 and then applied to the SIL 25.

The SIL 25 is one made by cutting a part from a spherical lens and has a high refractivity index. It is held and positioned, having its spherical surface opposing the aspherical lens 24 and its flat surface opposing the glass master disk 15. Since the SIL 25 is interposed between the aspherical lens 24 and the glass master disk 15, the two-group lens can attain a numerical aperture greater than that of the aspherical lens 24. The optical head 14 can therefore form a light spot that is smaller than otherwise. This makes it possible to record data at high density on the glass master disk 15.

Of the light incident on the SIL 25, that part applied at an angle equal to or larger than the angle that causes total reflection is totally reflected in the SIL 25 and does not emerge from the SIL 25. Nonetheless, evanescence coupling takes places when the SIL 25 approaches the glass master disk 15, to a distance at which a near-field light beam is generated (generally, equal to or shorter than the wavelength of the light). A part of the light totally reflected therefore emerges to the glass master disk 15 as a near-field beam. Thus, a beam is applied to the disk 15 from within the SIL 25. A part of the near-field beam applied to the glass master disk 15 is reflected from the disk 15 and applied to the SIL 25.

Figure 3:
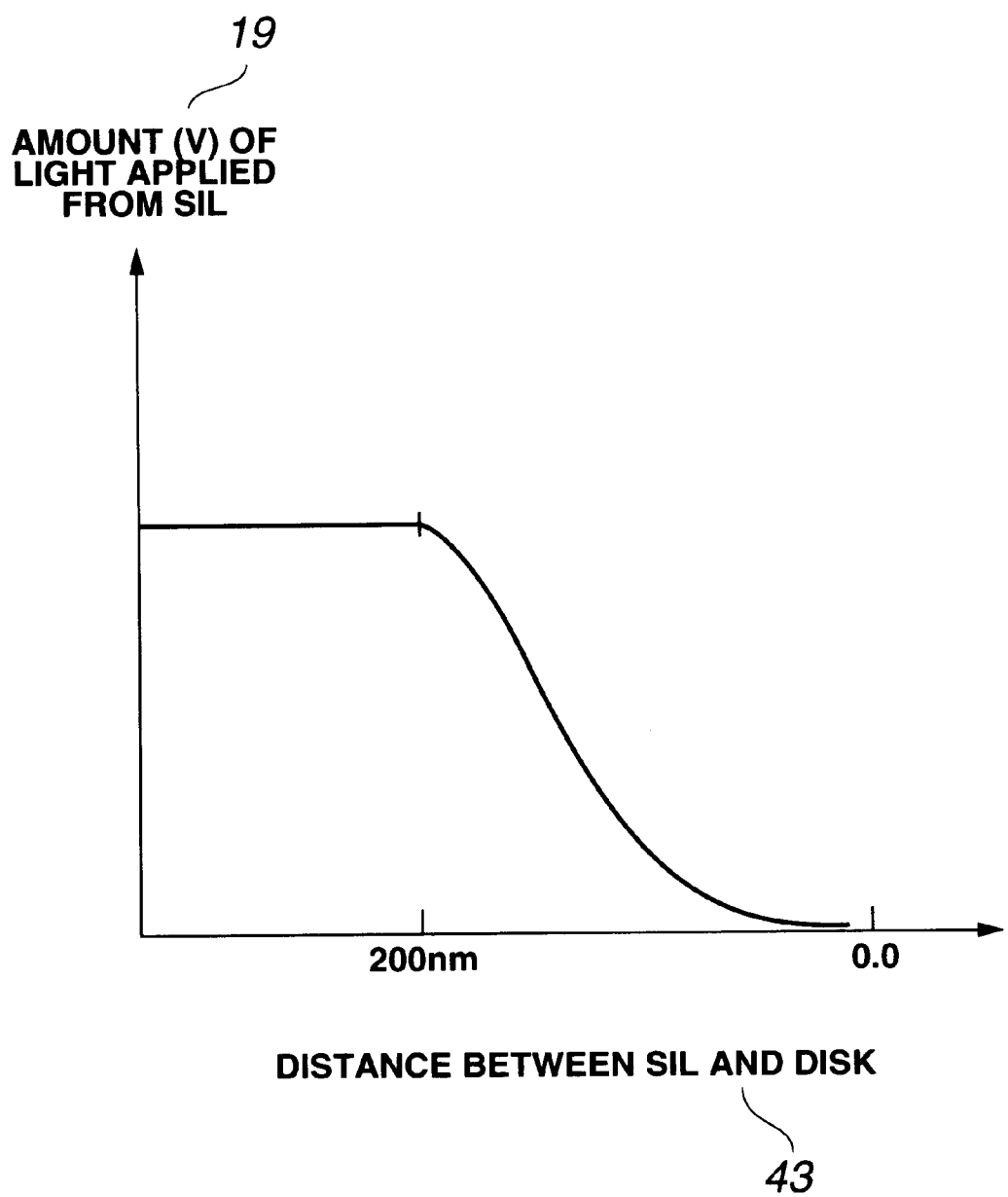
FIG. 3 is a graph representing the relation the distance between an optical recording medium and the surface of an SIL has with the amount of light reflected from the SIL.

FIG. 3 represents the relation the distance between the glass master disk 15 and the SIL 25 has with the intensity of the laser beam LB3 detected by the PD(2) 17 (i.e., the amount (V) of light reflected from the disk 15). In the present embodiment, no near-field beams are generated and the light is totally reflected in the SIL 25 as long as the distance between the SIL 25 and the disk 15 remains equal to or more than 200 nm. In this case, the intensity of the laser beam LB3 remains constant. If the distance is less than 200 nm, however, the intensity of the beam LB3 will decrease because a part of the light incident on the SIL 25 passes through the disk 15 as a near-field beam. If the SIL 25 contacts the glass master disk 15, all light incident on the SIL 25 will pass through the glass master disk 15. Hence, the intensity of the beam BL3 reflected from the disk 15 and applied from the SIL 25 will be zero (0.0).

As can be understood from FIG. 3, the distance between the disk 15 and the SIL 25 and the intensity of the laser beam LB3 are directly related with each other. If the linear region of the relation is utilized, it will be easy to control the distance to a target value.

In the present invention, the intensity (V) of the laser beam LB3 reflected from the disk 15 and supplied from the SIL 25 is controlled to maintain a constant distance between the SIL 25 and the glass master disk 15. The piezoelectric element 23, which can convert an electric signal to a displacement in the order of nanometers, is used as drive means for changing the distance between the SIL 25 and the disk 15. As shown in FIG. 2, the two-group lens is attached to the piezoelectric element 23. A control voltage 22 is applied to the piezoelectric element 23, which moves the two-group lens in accordance with the amount of the light reflected from the disk 15. The distance between the SIL 25 and the disk 15 is thereby maintained constant. In this embodiment, the piezoelectric element 23 expands 12 nm when applied with 150 V. Thus, the SIL 25 approaches the glass master disk 15 when a voltage is applied to the piezoelectric element 23.

The value detected by a position sensor that detects the distance between the SIL 25 and the disk 15 may be applied to maintain that distance at a constant value.

Figure 4:
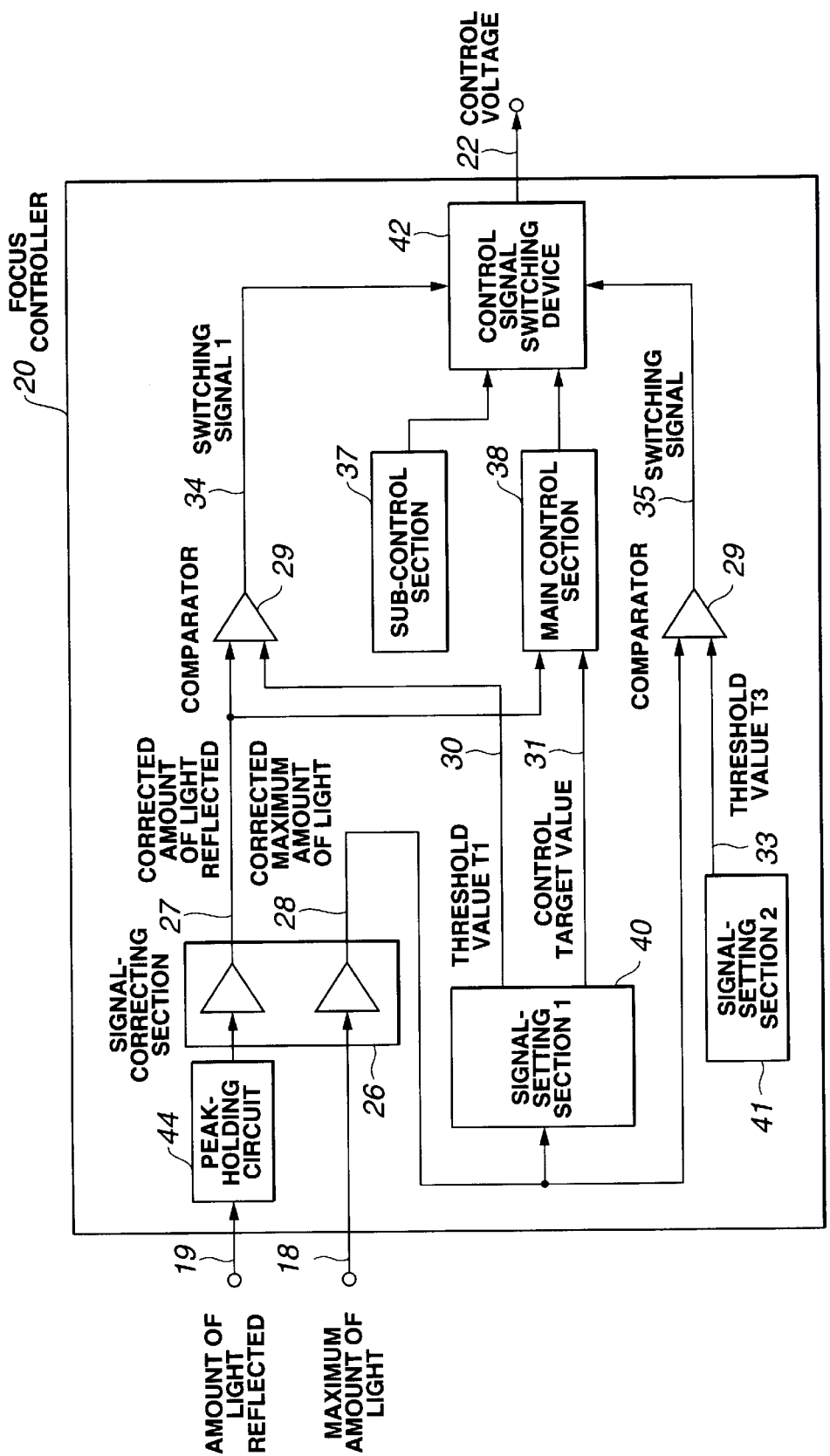
FIG. 4 is a block diagram of the focus controller provided in the optical recording apparatus.

FIG. 4 depicts the internal structure of the focus controller 20. The focus controller 20 comprises a peak-holding circuit 44, a signal-correcting section 26, a signal-setting section (1) 40, a signal-setting section (2) 42, a comparator 29, a sub-control section 37, a main control section 38, and a control-signal switching device 42. The focus controller 20 receives the amount 19 of light from an input terminal IN1 and the maximum amount 18 of light from an input terminal IN2 and uses these amounts of light to accomplish focus control. A switching signal (1) 34 and a switching signal (2) 35 are supplied to the control-signal switching device 42. In accordance with these signals, the device 42 switches the signals supplied from the sub-control section 37 and main control section 36, thereby generating a control voltage 22 that will drive the piezoelectric element 23.

Figure 5:
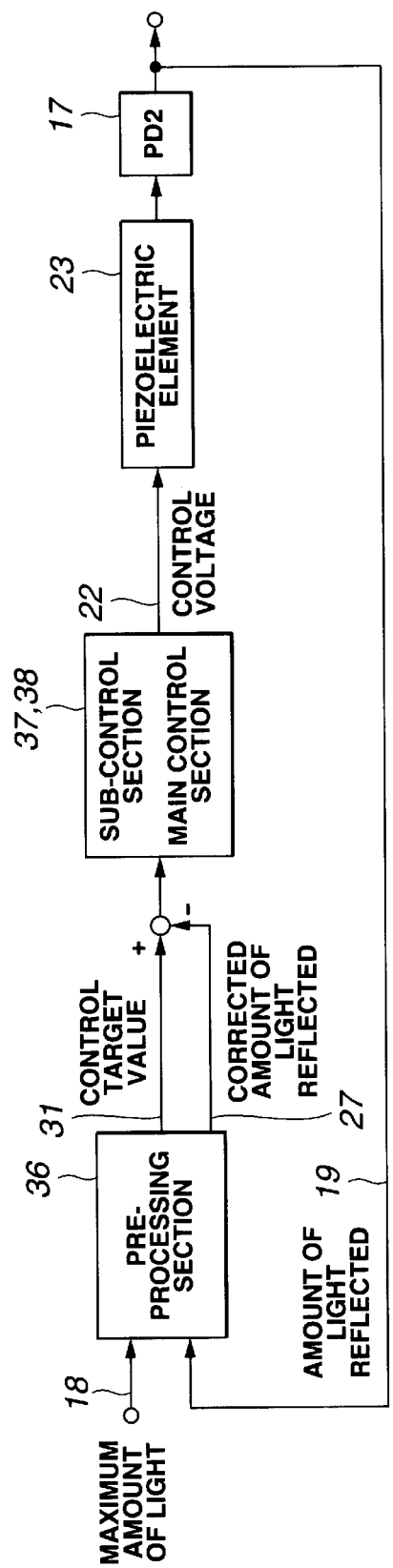
FIG. 5 is a diagram explaining the sequence of focus control performed in the optical recording apparatus.

FIG. 5 explains the sequence of focus control performed by the focus controller 20. The focus controller 20 performs feedback control on the piezoelectric element 23 in accordance with the amount 19 of light applied from the SIL 25. A pre-processing section 36 pre-processes the maximum amount 18 of light and the amount 19 of light before the feedback control is initiated, in order to render the amount 27 of light, corrected, equal to a target value 31. The focus control effected in the present embodiment will be explained, with reference to FIGS. 4 to 7.

Figure 6:
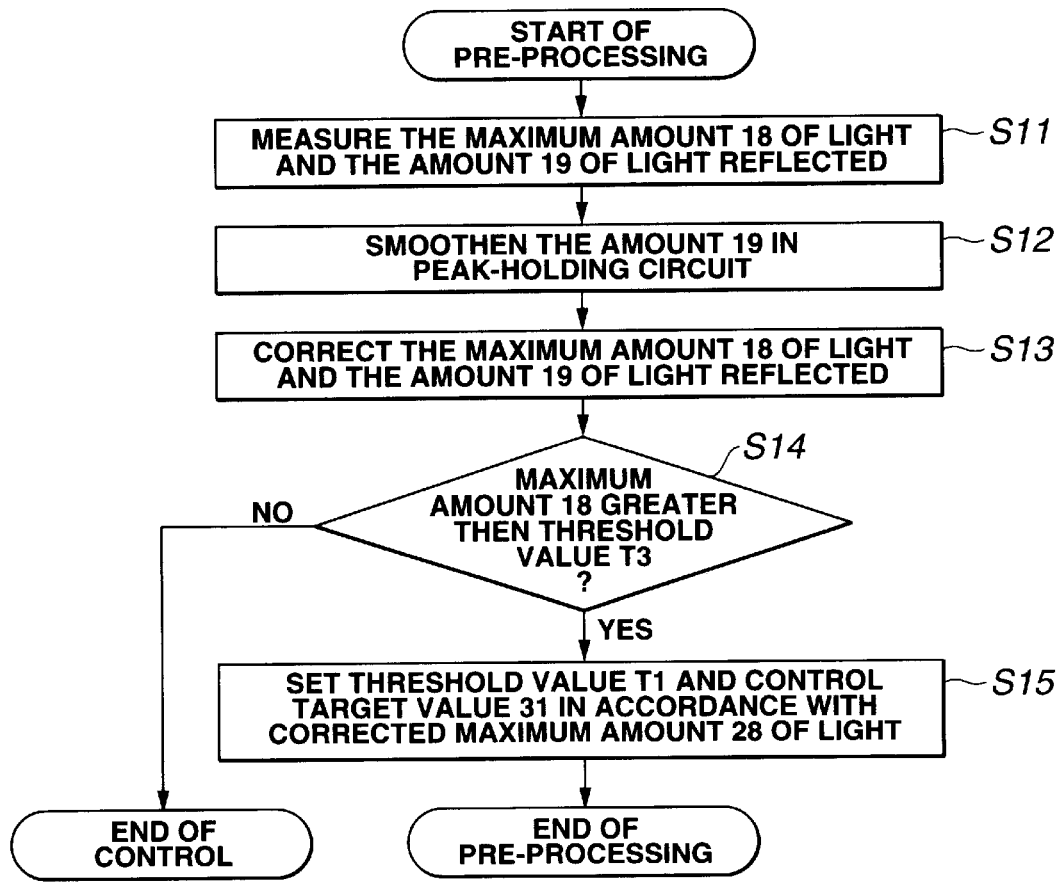
FIG. 6 is a flowchart explaining the sequence of operation that is effected in the optical recording apparatus before the focus control is carried out.

The pre-processing performed in the pre-processing section 36 will be described, with reference to the flowchart of FIG. 6. First, in Step S11, the maximum amount 18 of light, represented by a modulated record signal and the amount 19 of light applied from the SIL 25 are measured.

In Step S12, the peak-holding circuit 44 shown in FIG. 4 converts the amount 19 of light to a DC voltage. The circuit 44 can convert the amount 19 of light to a DC voltage even if the record signal is an EFM signal or a 1–7 modulated signal. Hence, the amount 19 of light applied from the SIL 25 can be used as a controlled value.

The maximum amount 18 is a DC voltage, too. Therefore, the amount 19 of light reflected from the disk 15 can be compared with the maximum amount 18 if it is converted to a DC voltage.

In step S13, the signal-correcting section 26 corrects the amount 19 of light reflected, so that the amount 19 may become equal to the maximum amount 18 of light while the SIL 25 remains at such distance from the disk 15 that no near-field beams are generated. This makes it possible to compare the maximum amount 18 and the amount 19 on the same scale in terms of signal level.

In Step S14, it is determined whether or not the recording laser element 4 is operating normally. If the element 4 is operating normally, it emits a laser beam of a prescribed intensity under the control of the APC 9. When the recording laser element 4 assumes an unstable state, however, it can no longer be controlled by the APC 9 and its output power may become stable and too small. If this happens, it becomes impossible to record data at all. When this abnormal condition takes place, the control system including the sub-control section 37 and the main control section 38 is stopped. The abnormal condition can be detected by comparing the maximum amount 18 of light with the threshold value T3 (33) set in the signal-setting section (2) 41 shown in FIG. 4.

Figure 9:
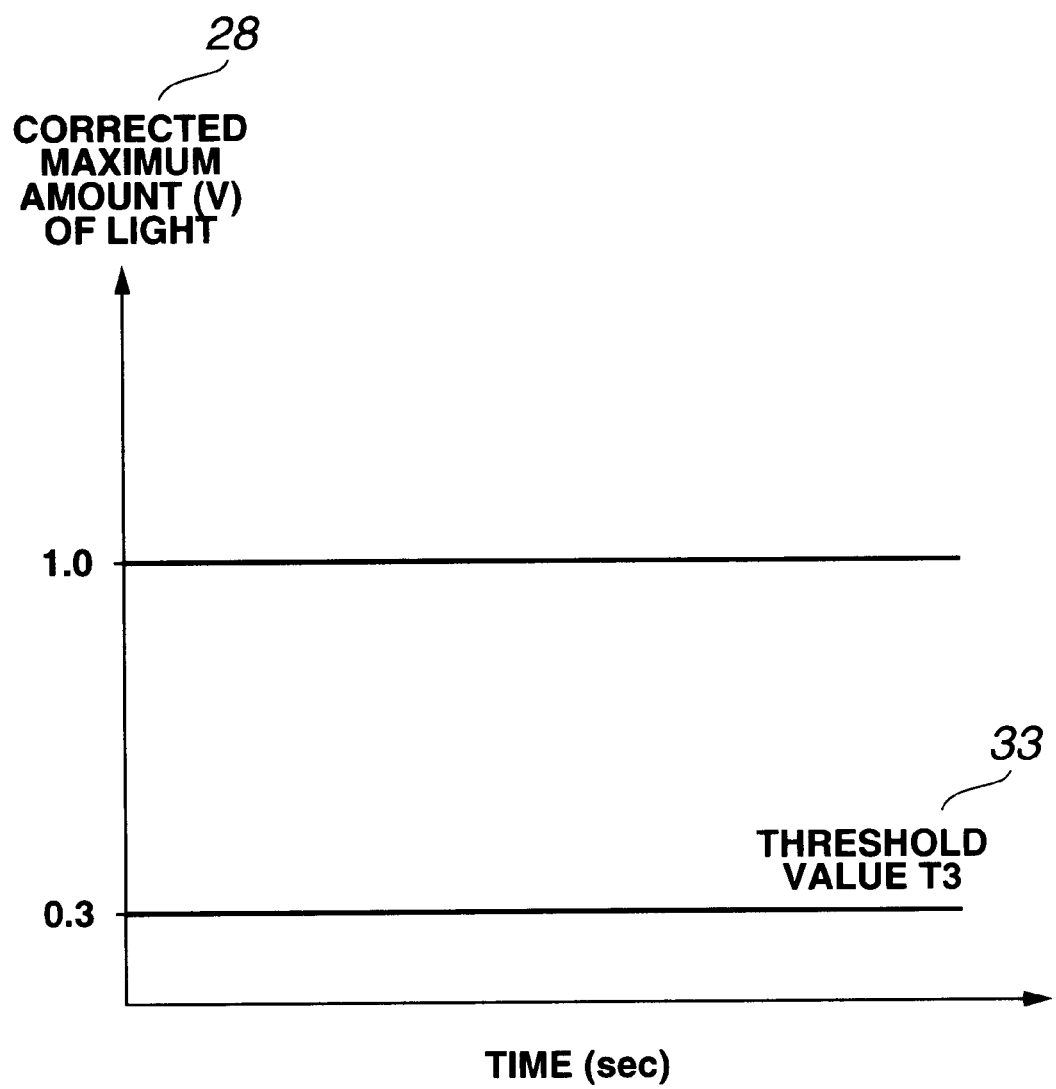
FIG. 9 is a timing chart showing a signal set by the signal-setting section 2 used in the focus controller shown in FIG. 4.

FIG. 9 is a timing chart showing a signal set by the signal-setting section 41 shown in FIG. 4. If the recording laser element 4 is operating normally, the corrected maximum amount 28 of light has a constant value larger than the threshold value T3 (33). If the laser element 4 is operating abnormally, the corrected maximum amount 28 of light has a constant value smaller than the threshold value T3 (33).

It the recording laser element 4 is operating normally, the operation goes to Step S15. In Step S15, a threshold value T1 and a control target value 31 are set in accordance with the corrected maximum amount 28 of light.

The threshold value T1 is greater than the control target value 31. That is, T1 >control target value. The threshold value T1 is independent of the threshold value T3 from which it is determined whether the recording laser element 4 is operating abnormally or not. The source of the threshold value T1 is the maximum amount 18 of light, which is constant. Instead, a constant voltage source may be used to generate the threshold value T1.

Figure 10:
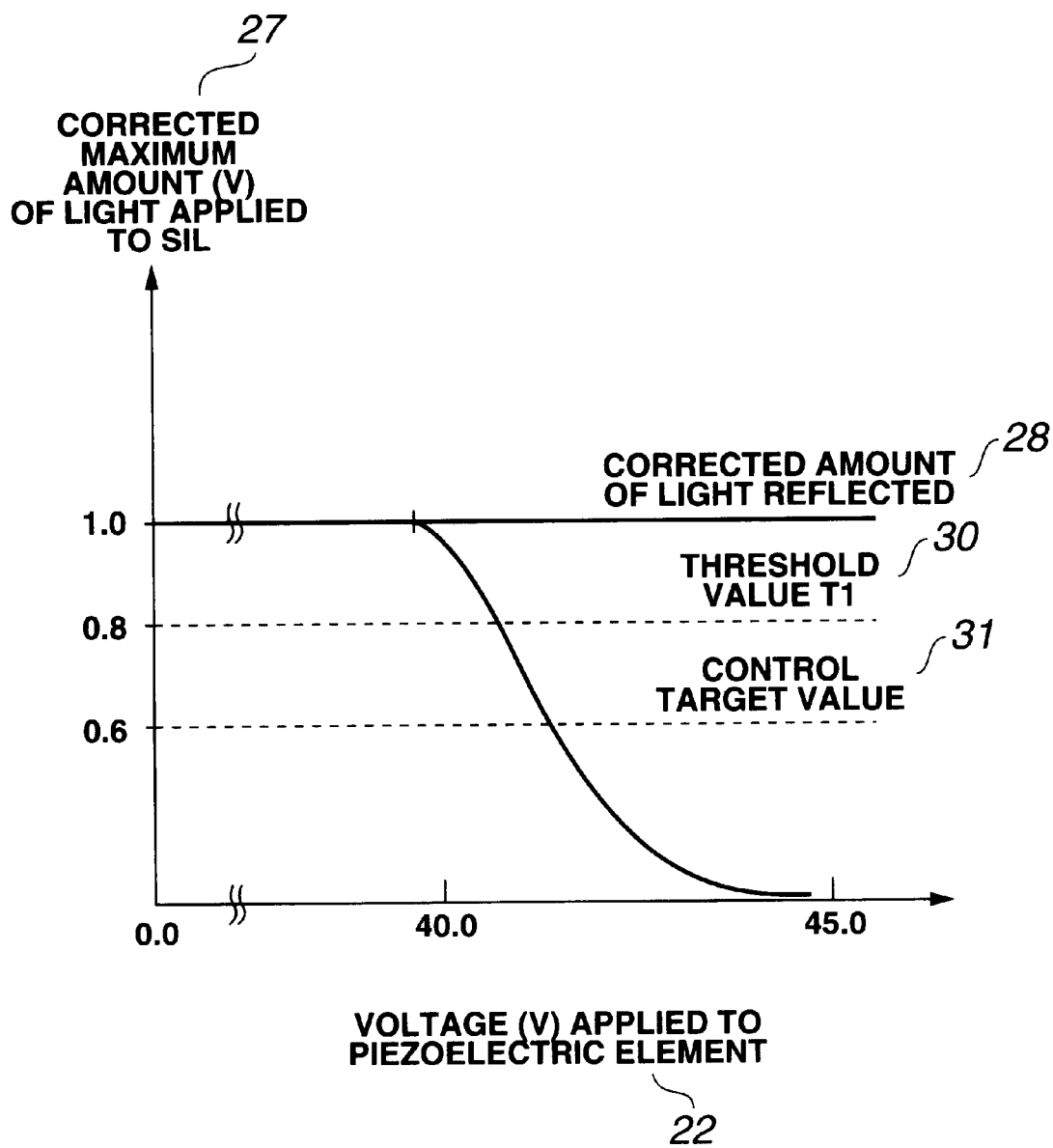
FIG. 10 is a timing chart depicting another type of a signal set by the signal-setting section 1 used in the focus controller shown in FIG. 4.

FIG. 10 is a timing chart depicting a signal set by the signal-setting section 40 shown in FIG. 4. The corrected maximum amount 28 of light is constant if the recording laser element 4 is operating normally. Therefore, the threshold value T1 and the control target value 31 are generated in accordance with the corrected maximum amount 28 in the present embodiment. The threshold value T1 and the control target value 31 may be generated from a constant voltage.

Thus far described is the pre-processing that is performed before the optical recording apparatus according to the invention starts the effecting focus control.

Figure 7:
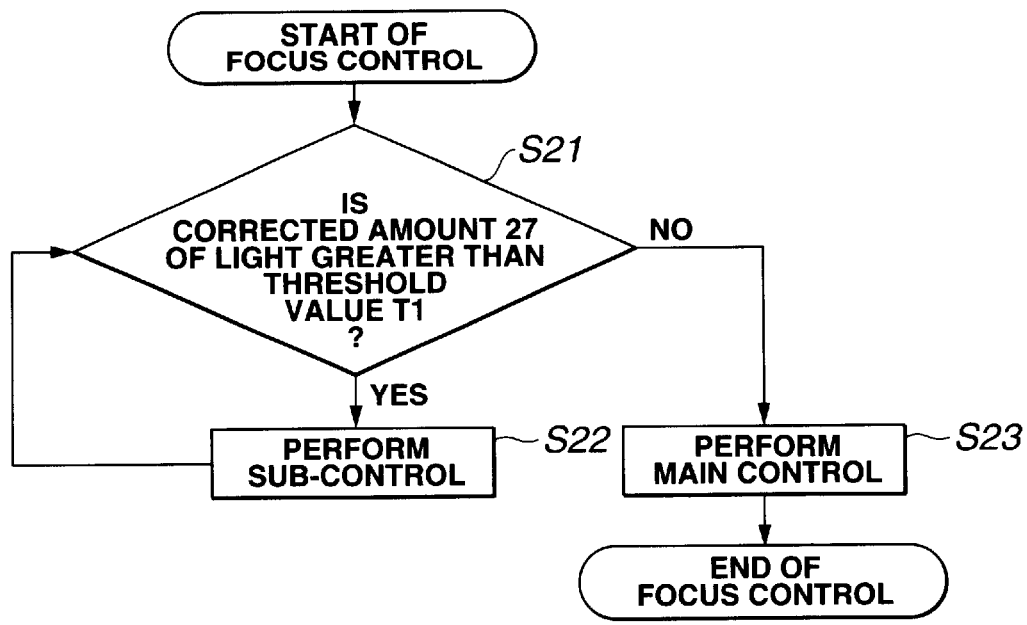
FIG. 7 is a flowchart explaining the sequence of initiating the focus control in the optical recording apparatus.

Upon completion of the pre-processing, a control loop starts operating. FIG. 7 shows the sequence of initiating the focus control in the optical recording apparatus. More precisely, FIG. 7 shows how the corrected amount 27 of light is rendered equal the target value 31.

First, in Step S21, the comparator 29 compares the corrected amount 27 of light reflected and the threshold value T1. If the corrected amount 27 is greater than the threshold value T1, it is known that the SIL 25 is so distant from the glass master disk 15 that no near-field beams are generated. In this case, comparator 29 generates a switching signal (1) 34, which is supplied to the control-signal switching device 42. In response to the signal 34, the device 42 selects and outputs the control signal supplied from the sub-control section 37. Thus, in Step S22, the sub-control section 37 controls the piezoelectric element 23. To state more specifically, the sub-control section 37 increases the voltage applied to the piezoelectric element 23 at a low rate, thereby moving the SIL 25 toward the glass master disk 15 until a near-field beam emerges from the glass master disk 15.

The piezoelectric element 23 moves the SIL 25 toward the glass master disk 15 at such a speed that the SIL 25 may not collide on the disk 15 due to an overshoot. Note that such an overshoot is caused by the main control section 38 when the device 42 selects the control signal generated by the main controller 38 and supplies the same to the piezoelectric element 23.

The sub-control section 37 is, for example, an integration circuit that has a relatively large time constant (about 1.0).

When the corrected amount 27 of light reflected becomes smaller than the threshold value T1, the control voltage the sub-control section 37 outputs at the time is held. In Step S23, the control-signal switching device 42 selects the control signal output from the main control section 38. The main control section 38 generates a control voltage that will eliminate the difference between the control target value 31 and the corrected amount 27 of light reflected. The main control section 38 is, for example, a phase-compensating filter designed on the basis of a frequency response.

The voltage generated by the sub-control section 37 is added to the output of the main control section 38. The sum of these voltages is applied to the piezoelectric element 23. The difference between the control target value 31 and the corrected amount 27 of light reflected is thereby eliminated, thus maintaining the constant distance between the SIL 25 and the glass master disk 15.

The voltage output by the sub-control section 37 may be held throughout the control. Alternatively, the voltage may be copied into the main control section 38 and released therefrom when the device 42 selects the control signal generated by the main control section 38. In this case, the piezoelectric element 23 is controlled by the main control section 38 only.

How the corrected amount 27 of light is rendered equal the target value 31 has just been explained. Once the corrected amount 27 has been rendered equal the target value 31, the main control section 38 maintain a constant distance between the SIL 25 and the glass master disk 15.

In practice, however, an external disturbance is applied to the feedback control loop. The external disturbance may result from defects such as scars or depressions made in the surface of the glass master disk 15. The focus control of this invention is effected in order to maintain a constant distance between the SIL 25 and the glass mater disk 15, at which a near-field beam is generated. The distance falls in the order of nanometers. Hence, the focus control is more affected by defects such as scars or depression made in the surface of the disk 15 than the conventional focus control that is achieved in the order of microns. An external disturbance may cause the SIL 25 to collide with the glass master disk 15. It is therefore necessary to control the SIL 25 not to collide with the disk 15 even if an external disturbance is applied to the control loop. To this end, a control mechanism robust to external disturbances is employed to accomplish the focus control in the present invention.

Figure 8:
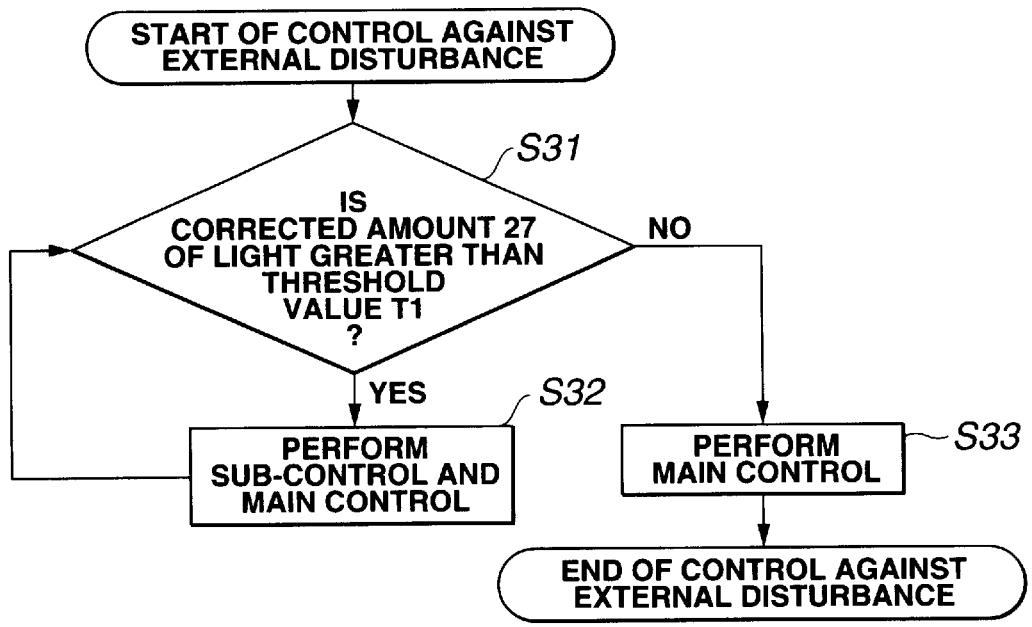
FIG. 8 is a flowchart explaining the sequence of focus control, which is performed when an external disturbance is applied to the optical recording apparatus.

FIG. 8 explains the sequence of focus control, which is performed when an external disturbance is applied to the feedback control loop. First, the corrected amount 27 of light reflected is compared with the threshold value T1 in Step S31.

Figure 11:
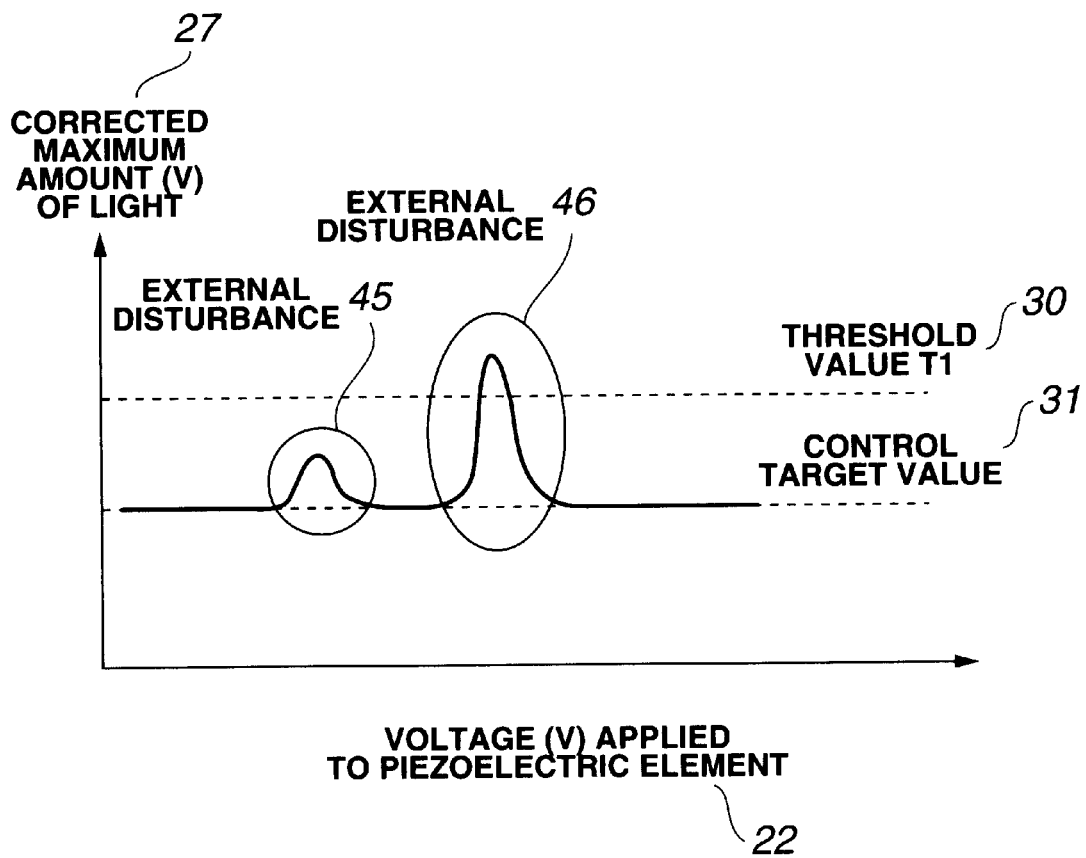
FIG. 11 is a graph representing how the mount of the light reflected from the optical recording medium changes if the medium has scars in its light-receiving surface.

FIG. 11 is a graph representing how the corrected mount 27 of the light reflected changes if the glass master disk 15 has scars in its surface. Even if the SIL 25 is controlled to maintain a constant distance between it and the glass master disk 15, the actual distance is longer if the disk 15 has scars in its surface. Hence, the corrected amount 27 of light reflected from any scar increases as indicated by external disturbances 45 and 46 shown in FIG. 11.

If the corrected amount 27 of light reflected increases to a value less than the threshold value T1 as in the case of the external disturbance 45, the main control section 38 controls the corrected amount 27 to suppress the influence of the external disturbance.

If the corrected amount 27 of light reflected increases to a value greater than the threshold value T1 as in the case of the external disturbance 46, not only the main control section 38 but also the sub-control section 37 controls the corrected amount 27 in Step S32. In this case, the influence of the external disturbance is suppressed quickly.

More precisely, the control voltage of the main control section 38 is held the moment the corrected amount 27 of light reflected surpasses the threshold value T1. While the corrected value 27 remains greater than the threshold value T1, the sub-control section 37 performs the control and the sum of the control voltages of the main control section 38 and sub-control section 37 is applied to the piezoelectric element 23. The influence of the external disturbances is thereby suppressed.

In the control sequence illustrated in FIG. 8, the sub-control section 37 is used in combination with the main control section 38 in the optical recording apparatus of the invention, only when the corrected amount 27 of light reflected surpasses the threshold value T1. Hence, no excessive control is carried out against any external disturbance. The sub-control section 37 is a system that responds to an external disturbance but slowly. The section 37 therefore would not respond to external disturbances that abruptly take place.

Thus, the focus controller 20 can perform a stable focus control even if the glass master disk 15 has scars in its surface, not responding to abrupt external disturbances and effectively suppressing external disturbances that are greater than a reference disturbance.

What is claimed is:

1. An optical recording apparatus comprising:
    first optical means for condensing light to be applied to an optical recording medium, said first optical means having a numerical aperture;
    second optical means interposed between the first optical means and the optical recording medium, for attaining a numerical aperture larger than the numerical aperture of the first optical means;
    main control means for maintaining a predetermined distance between the second optical means and the optical recording medium, by utilizing a linear characteristic of an amount of light reflected from the optical recording medium in a near-field region provided between an end of the second optical means and the optical recording medium;
    means for setting a threshold value corresponding to the amount of the light reflected from the optical recording medium and a control target value falling within the linear characteristic of the amount of light reflected; and
    a sub-control means for suppressing the influence of the amount of light reflected when the amount of light reflected is greater than the threshold value, and in which the main control means or the sub-control means, or both are used in accordance with a relation the amount of light reflected has with the threshold value or the control target value.

2. The optical recording apparatus according to claim 1, wherein the sub-control means is used to maintain the predetermined distance between the second optical means and the optical recording medium when the amount of the light reflected from the optical recording medium is greater than the threshold value after the second optical means starts performing focus control with respect to the optical recording medium and before the amount of light reflected becomes equal to the control target value.

3. The optical recording apparatus according to claim 1, wherein the main control section is used instead of the sub-control means to maintain the predetermined distance between the second optical means and the optical recording medium when the amount of the light reflected from the optical recording medium becomes smaller than the threshold value after the second optical means starts performing focus control with respect to the optical recording medium and before the amount of light reflected becomes equal to the control target value.

4. The optical recording apparatus according to claim 1, wherein both the main control section and the sub-control means are used to maintain the predetermined distance between the second optical means and the optical recording medium when the amount of the light reflected from the optical recording medium becomes greater than the threshold value after the second optical means starts performing focus control with respect to the optical recording medium and the amount of light reflected becomes equal to the control target value.

5. The optical recording apparatus according to claim 4, wherein the amount of the light reflected from the optical recording medium becomes greater than the threshold value after the amount of light reflected becomes equal to the control target value, due to scars and depressions made in the surface of the optical recording medium.

6. The optical recording apparatus according to claim 1, which further comprises detecting means for detecting the intensity of light emitted from a light source, and in which the distance between the second optical means and the optical recording medium is prevented from changing to make the light emitted from the light source become a near-field light beam, irrespective of the operation of the main control means and sub-control means, when the intensity of the light detected by the detecting means is insufficient for recording data.

7. The optical recording apparatus according to claim 1, wherein a piezoelectric element to which the first and second optical means are secured is used as drive means for changing the distance between the second optical means and the optical recording medium.

8. An optical recording/reproducing method comprising:
    a main control step of maintaining a predetermined distance between second optical means and an optical recording medium by utilizing a linear characteristic of an amount of light reflected from the optical recording medium in a near-field region provided between an end of the second optical means and the optical recording medium, thereby to impart to the second optical means a numerical aperture larger than the numerical aperture of a first optical means, said second optical means having been interposed between the first optical means and the optical recording medium;
    a setting step of setting a threshold value for the amount of light reflected from the optical recording medium and a control target value falling within the within the linear characteristic of the amount of light reflected; and
    a sub-control step of suppressing the influence of the amount of light reflected when the amount of light reflected is greater than the threshold value,
    wherein the main control step or the sub-control step, or both are performed in accordance with a relation the amount of light reflected has with the threshold value or the control target value.

9. The optical recording/reproducing method according to claim 8, wherein the sub-control step is performed to maintain the predetermined distance between the second optical means and the optical recording medium when the amount of the light reflected from the optical recording medium is greater than the threshold value after the second optical means starts performing focus control with respect to the optical recording medium and before the amount of light reflected becomes equal to the control target value.

10. The optical recording/reproducing method according to claim 8, wherein the main control step is performed instead of the sub-control step to maintain the predetermined distance between the second optical means and the optical recording medium when the amount of the light reflected from the optical recording medium becomes smaller than the threshold value after the second optical means starts performing focus control with respect to the optical recording medium and before the amount of light reflected becomes equal to the control target value.

11. The optical recording/reproducing method according to claim 8, wherein both the main control step and the sub-control step are performed to maintain the predetermined distance between the second optical means and the optical recording medium when the amount of the light reflected from the optical recording medium becomes greater than the threshold value after the second optical means starts performing focus control with respect to the optical recording medium and the amount of light reflected becomes equal to the control target value.

12. The optical recording/reproducing method according to claim 11, wherein the amount of the light reflected from the optical recording medium becomes greater than the threshold value after the amount of light reflected becomes equal to the control target value, due to scars and depressions made in the surface of the optical recording medium.

13. The optical recording/reproducing method according to claim 8, which further comprises a detecting step of detecting the intensity of light emitted from a light source, and in which the distance between the second optical means and the optical recording medium is prevented from changing to make the light emitted from the light source become a near-field light beam, irrespective of the main control step and sub-control step, when the intensity of the light detected by the detecting means is insufficient for recording data.

* * * * *

UNITED STATES PATENT AND TRADEMARK OFFICE
CERTIFICATE OF CORRECTION

PATENT NO. : 6,791,913 B1
DATED : September 14, 2004
INVENTOR(S) : Tsutomu Ishimoto It is certified that error appears in the above-identified patent and that said Letters Patent is hereby corrected as shown below:

<u>Title page,</u>
Item [56], References Cited, FOREIGN PATENT DOCUMENTS, add
-- SW 00119507.2 --

<u>Column 4,</u>
Line 1, change "abeam" to -- a beam --.

Signed and Sealed this

Eleventh Day of January, 2005

JON W. DUDAS
*Director of the United States Patent and Trademark Office*

UNITED STATES PATENT AND TRADEMARK OFFICE
CERTIFICATE OF CORRECTION

PATENT NO. : 6,791,913 B1  Page 1 of 1
APPLICATION NO. : 09/652897
DATED : September 14, 2004
INVENTOR(S) : Tsutomu Ishimoto It is certified that error appears in the above-identified patent and that said Letters Patent is hereby corrected as shown below:

Column 4, line 1, Change "abeam" to --a beam--.

Signed and Sealed this

Twenty-eighth Day of August, 2007

JON W. DUDAS
*Director of the United States Patent and Trademark Office*